United States Patent
Welch, Jr.

(10) Patent No.: US 7,788,360 B2
(45) Date of Patent: Aug. 31, 2010

(54) CONFIGURABLE DISTRIBUTED INFORMATION SHARING SYSTEM

(75) Inventor: Charles D. Welch, Jr., St. Joseph, MO (US)

(73) Assignee: RouteSync, LLC, Lenexa, KS (US)

( * ) Notice: Subject to any disclaimer, the term of this patent is extended or adjusted under 35 U.S.C. 154(b) by 194 days.

(21) Appl. No.: 11/852,422

(22) Filed: Sep. 10, 2007

(65) Prior Publication Data

US 2009/0070401 A1 Mar. 12, 2009

(51) Int. Cl.
*G06F 15/173* (2006.01)
*G06F 15/16* (2006.01)

(52) U.S. Cl. .................. 709/223; 709/238; 709/245

(58) Field of Classification Search ............. 709/223, 709/238, 242, 245
See application file for complete search history.

(56) References Cited

U.S. PATENT DOCUMENTS

| | | | |
|---|---|---|---|
| 6,154,811 A * | 11/2000 | Srbljic et al. ............. | 711/118 |
| 6,393,419 B1 | 5/2002 | Novak et al. | |
| 6,529,917 B1 | 3/2003 | Zoltan | |
| 6,564,251 B2 * | 5/2003 | Katariya et al. ............. | 709/214 |
| 6,574,715 B2 * | 6/2003 | Challenger et al. .......... | 711/141 |
| 6,633,874 B1 * | 10/2003 | Nusbickel .................. | 707/10 |
| 6,662,198 B2 | 12/2003 | Satyanarayanan et al. | |
| 6,754,681 B2 | 6/2004 | Brodersen et al. | |
| 6,917,618 B2 | 7/2005 | Thubert et al. | |
| 7,024,428 B1 | 4/2006 | Huang et al. | |
| 7,051,053 B2 * | 5/2006 | Sinha ....................... | 707/204 |
| 7,072,911 B1 | 7/2006 | Doman et al. | |
| 7,073,129 B1 * | 7/2006 | Robarts et al. ............. | 715/740 |
| 7,088,718 B1 | 8/2006 | Srivastava | |
| 7,194,530 B2 * | 3/2007 | Kayashima et al. ........ | 709/223 |
| 7,315,891 B2 * | 1/2008 | Donahue ................... | 709/224 |
| 7,430,744 B2 * | 9/2008 | Straube et al. ............. | 719/313 |
| 2003/0208511 A1 | 11/2003 | Earl et al. | |
| 2005/0021567 A1 | 1/2005 | Holenstein et al. | |
| 2005/0251538 A1 | 11/2005 | Cooke et al. | |
| 2005/0289198 A1 | 12/2005 | Todd | |
| 2006/0015546 A1 | 1/2006 | Sawadsky et al. | |
| 2006/0184591 A1 | 8/2006 | Backholm et al. | |

* cited by examiner

*Primary Examiner*—Hussein A Elchanti
(74) *Attorney, Agent, or Firm*—Polsinelli Shughart PC

(57) ABSTRACT

A configurable distributed information sharing system includes a process for controlling the sharing of data entities among a plurality of interconnected computers including one or more servers and a plurality of client computers. As transactions are processed by the client computers, the client computers log new data records, modified data records, and deleted data records. During communication sessions with servers, the client computers convey the changed data entities to the server for relay to other client computers according to a data sharing table. The data sharing table includes a data source column listing all data sending computers, a data destination column matching all data receiving computers with data sending computers from which they will receive changed data, and a data identification column matching all the types of data that will be shared among specific data sending and data receiving computers.

24 Claims, 8 Drawing Sheets

| Routing Table | | | |
|---|---|---|---|
| From Store ID | To Store ID | Shared Information | Processing Server ID |
| 101 | 102 | Patient | 106 |
| 101 | 102 | SIG Codes | 106 |
| 101 | 102 | Doctors | 106 |
| 101 | 102 | Pricing | 106 |
| 101 | 103 | Patient | 106 |
| 101 | 103 | SIG Codes | 106 |
| 101 | 103 | Doctors | 106 |
| 101 | 103 | Pricing | 106 |
| 101 | 104 | Patient | 106 |
| 101 | 104 | SIG Codes | 106 |
| 101 | 104 | Doctors | 106 |
| 101 | 104 | Pricing | 106 |
| 102 | 101 | Patient | 106 |
| 102 | 101 | SIG Codes | 106 |
| 102 | 101 | Doctors | 106 |
| 102 | 101 | Pricing | 106 |
| 102 | 103 | Patient | 106 |
| 102 | 103 | SIG Codes | 106 |
| 102 | 103 | Doctors | 106 |
| 102 | 103 | Pricing | 106 |
| 102 | 104 | Patient | 106 |
| 102 | 104 | SIG Codes | 106 |
| 102 | 104 | Doctors | 106 |
| 102 | 104 | Pricing | 106 |

*Fig. 3A*

| Routing Table (Cont'd.) | | | |
|---|---|---|---|
| From Store ID | To Store ID | Shared Information | Processing Server ID |
| 103 | 101 | Patient | 106 |
| 103 | 101 | SIG Codes | 106 |
| 103 | 101 | Doctors | 106 |
| 103 | 101 | Pricing | 106 |
| 103 | 102 | Patient | 106 |
| 103 | 102 | SIG Codes | 106 |
| 103 | 102 | Doctors | 106 |
| 103 | 102 | Pricing | 106 |
| 103 | 104 | Patient | 106 |
| 103 | 104 | SIG Codes | 106 |
| 103 | 104 | Doctors | 106 |
| 103 | 104 | Pricing | 106 |
| 104 | 101 | Patient | 106 |
| 104 | 101 | SIG Codes | 106 |
| 104 | 101 | Doctors | 106 |
| 104 | 101 | Pricing | 106 |
| 104 | 102 | Patient | 106 |
| 104 | 102 | SIG Codes | 106 |
| 104 | 102 | Doctors | 106 |
| 104 | 102 | Pricing | 106 |
| 104 | 103 | Patient | 106 |
| 104 | 103 | SIG Codes | 106 |
| 104 | 103 | Doctors | 106 |
| 104 | 103 | Pricing | 106 |
| 101 | 105 | All Tables | 106 |
| 102 | 105 | All Tables | 106 |
| 103 | 105 | All Tables | 106 |
| 104 | 105 | All Tables | 106 |

| Alternative Routing Table ||||
| From Store ID | To Store ID | Group ID | Processing Server ID |
|---|---|---|---|
| 101 | 102 | 1 | 106 |
| 101 | 103 | 1 | 106 |
| 101 | 104 | 1 | 106 |
| 102 | 101 | 1 | 106 |
| 102 | 103 | 1 | 106 |
| 102 | 104 | 1 | 106 |
| 103 | 101 | 1 | 106 |
| 103 | 102 | 1 | 106 |
| 103 | 104 | 1 | 106 |
| 104 | 101 | 1 | 106 |
| 104 | 102 | 1 | 106 |
| 104 | 103 | 1 | 106 |
| 101 | 105 | 2 | 106 |
| 102 | 105 | 2 | 106 |
| 103 | 105 | 2 | 106 |
| 104 | 105 | 2 | 106 |

*Fig. 4A*

| Group Table ||
| Group ID | Table |
|---|---|
| 1 | Patient |
| 1 | SIG Codes |
| 1 | Doctors |
| 1 | Pricing |
| 2 | All Tables |

*Fig. 4B*

CONFIGURABLE DISTRIBUTED INFORMATION SHARING SYSTEM

BACKGROUND OF THE INVENTION

The present invention is broadly directed to distributed computer systems and, more particularly, to such systems having conveniently configurable information sharing capabilities.

In many different fields and businesses, information needs to be shared between companies and various individuals and groups of individuals within those companies. As an example, a pharmacy corporation may be organized as a world headquarters, national offices, regional offices, state and metropolitan offices, down to individual pharmacy stores and apothecaries. Pharmacy cooperatives may also be organized along similar models. An enormous amount of data must be tracked by all levels of such organizations to efficiently market a wide range of prescription and non-prescription products by a given corporation or cooperative. Data must also be appropriately shared among various individual computers and computing devices and among data servers to which the computers and devices are interconnected.

Although the present invention is not restricted to use within the pharmacy industry, the pharmacy industry is a particularly good example of the complex data sharing requirements that occur in many industries. In addition to inventory and sales information which all retailers must track, pharmacies must track patient information, physician information, insurance coverage information, billing information, prescription scripts, refill authorizations, patient signatures, SIG codes (standard and non-standard prescription abbreviations), and the like. Various pieces of the information that are logged must be shared with selected other computers within various components of the corporation for the corporation to function.

A given pharmacy may have one or more store servers which are interfaced to point-of-sale terminals and prescription terminals or computers. The point-of-sale terminals must have access to the store's inventory data to process sales of barcoded merchandise and must have communications access to credit and debit card issuers to process the financial aspects of non-cash sales transactions. Point-of-sale terminals must also have local tax rates programmed in so that sales taxes are computed and added to merchandise totals. Prescription computers must have access to the store's inventory of prescription drugs, each insurance company's proportion of coverage and required co-pay for each drug according to each plan offered by the insurance company, customers' insurance plan information, customers' prescription records, digitized copies of original prescription scripts, running counts of the number of times each drug has been dispensed on given prescriptions, information on prescribing physicians, standard information on drugs which is printed out whenever certain drugs are dispensed, cross-references between brand names of drugs and generic versions of the drugs, and other information. Once a prescription is filled and packaged, the sale of the prescription drug is logged on a point-of-sale terminal. Point-of-sale terminals and prescription computers typically require the entry of personal security codes for operation. As can be seen, the information needs and information access needs of pharmacy point-of-sale terminals and prescription computers are different, as are the needs for shared data.

There are data sharing needs in industries other than pharmacy stores. For example, many retailers such as department stores, home and garden stores, consumer electronics stores, automobile part stores, and the like have online catalog systems which consumers can browse to determine the availability of specific items at their local stores. Consumers may also be able to reserve the item online for pick-up at the local store. Data for such an online catalog server is derived from sales and inventory data of the local stores which is generated by sales processing at point-of-sale terminals within the stores. Sales and inventory data may be shared with other terminals and computers within a store and also migrate through the corporate computer system to a catalog server. A consumer selects the desired item, enters a location code, such as a postal ZIP code, and is presented with several stores in their vicinity, ranked by distance and an indication of the availability of the item at each of the displayed stores. Thus, certain inventory data is shared within a given store, with corporate computers, and with a catalog server, and also with customers or potential customers. The customer do not access the inventory data as such, only the availability of certain merchandise at a small selection of stores.

Returning to the pharmacy example, each store in a district may need to share sales and inventory data with a district office. Certain components of the data gathered by each district may need to be shared with a regional office and, in a similar manner, various data migrates up to a corporate headquarters. In addition to data which needs to be shared for a corporation to function, in the pharmacy industry, at least, there are legal requirements regarding certain types of personal health data which must be protected.

The computers of many companies are interconnected by more or less hard wired links in the form of local area networks with servers interconnected by leased lines. This often means that every computer in the system must be operational at all times for information to be shared or updated in a timely manner. It also may mean that if a particular computer is down because of malfunction or communication interruption, updates may be missed. On the other hand, there are often requirements for mobile data processing, such as for marketing representatives, technical support personnel, and the like who make use of laptop computers, tablet computers, personal digital assistants (PDA's), and so forth in the field. Such computers need to periodically communicate with the corporate system to synchronize databases, upload new data that has been generated, and download updates, messages, and other data.

An essential aspect of every corporate computer system is the capability of recovering from system malfunctions. For this purpose, backup or redundant copies of databases, programs, tables, logs, user profiles, and other data within a system are stored for use in restoring data which might be lost or corrupted by hardware, software, or communication failure. In communicating updates and other data and sharing data, it is desirable to do so in the most efficient manner, especially in a corporate system with a large sales volume. In the past, connections were often made by computers at the end of the business day for batch updates of data. Currently, more frequent updates are normally possible and are preferred.

Because business computing needs change over time, it is necessary at times to expand the numbers of servers and/or client computers, reduce the number, or reconfigure the connections and data sharing arrangements among the servers and client computers. Thus, it is desirable to organize connections of corporate computer systems and data sharing arrangements among the computers in such a manner as to enable the quickest and most convenient ways of expanding, retracting, and reconfiguring the connections and data sharing arrangements among corporate computers.

SUMMARY OF THE INVENTION

The present invention provides an improved configurable distributed information sharing system which addresses many of the problems which occur in the operation of large computer systems and in selectively sharing data among computers of such systems. The present invention provides a process for controlling the sharing of data entities among a plurality of interconnected or intercommunicating computers including one or more servers and a plurality of client computers. In an embodiment of the invention, communication sessions are periodically established between client computers and the servers, usually initiated by the client computers. As transactions are processed by the client computers, new data records are added, existing records are modified or updated, and some records are deleted. As the client computers process data, they log changes to their local databases in the form of new records, modifications to records, deletion of records, and the like.

The servers store master copies of a corporate database, which may include an entire database residing on a single server or a distributed database residing on a plurality of servers. For operational efficiency, it is desirable to communicate any database updates generated by data processing at the client computers to the master databases and to selected other client computers. The master plan for controlling the sharing of data among the servers and client computers of the system is implemented in the entries within a data sharing table which is stored on the server or servers.

In general, the data sharing table includes a source column, a destination column, and a data identification column. The source column lists each data sending computer which will communicate data entities with any other computer in the system. Data entities may include files, folders, tables, data records, updates to data records, deletion orders for data records, and the like. Similarly, the destination column matches each data receiving computer with every data sending computer which will communicate data entities to the data receiving computer. The data identification column matches each of a plurality of data types with each data sending computer which will communicate data entities of a given data type with each data receiving computer which will receive data entities of the given data type from selected data sending computers. Whenever any client computer connects with a server to communicate new, modified, or deleted data entities to a server, the server stores the information in the system. The server designates each data entity according to its data type for communication to any other client computer, according to entities within the data sharing table, the next time each designated client communicates with the server. The server then downloads any data entities which have been designated for the connected client computer, according to the data sharing table, from previous connection sessions with other client computers.

The servers within a system may be processing servers which further process data generated by client computers. A system may also include backup servers which store copies of databases and other data which can be used for recovery in the event of failure of a part of the system. The data sharing table can include additional columns which match particular servers with selected client computers and data types to be received from those client computers. Additionally, there may be a hierarchy of servers, such that some servers process data from a group of client computers but which function as clients to other servers within the hierarchy. The data sharing tables of the present invention treat each computer within a system as a data sending computer, as a data receiving computer, or as both, with changed information being sent from server to server or client to server.

The data sharing tables of the present invention enable a system to be expanded or reconfigured by adding entries into the columns of the tables or by changing the entries. The tables allow the data sharing arrangements of a system to be independent of the physical interconnection of the computers. Groups of computers within a system may have a given physical connection arrangement, have one virtual connection arrangement for certain types of data, and have another virtual connection arrangement for certain other types of data, all by appropriate entries within a data sharing table.

The processes of the present invention do not require that all client computers be in constant communication with their servers. The data sharing processes only clear data to be transferred from a client to a server or from a server to a client when a successful communication session has been completed. Thus, off-line operation of client computers, such as laptops, and communication session failures do not upset the orderly updating and sharing of data among the computers of a system. Updates can be uploaded from the previously offline client computers the next time they communicate with their server and, similarly, updates for the client computers can be downloaded during a connection session.

The processes of this invention allow for server-to-server connectivity. This process allows for servers to synchronize their information with other server systems and send information to other stores that are connecting with other server systems. This process allows for the synchronization of information between server systems and the different client systems that connect with those servers. The information, which is shared with other server systems, is then added to the file system or database system associated with the processing server to be shared with other client systems as the communication links are established with the client systems. The sharing of the information with the client systems is designated by the data sharing tables.

The processes of this invention allow for multiple processing systems to be connected to one data sharing device. This allows for more convenient load balancing between the processing systems and allows for easier expansion, without needing to add data sharing devices. This process also allows for server to server connectivity with another processing device to share information throughout a hierarchy of processing and file sharing systems. This hierarchy may be added to or extended to support network expansion.

Objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIGS. 3A and 3B illustrate an embodiment of a routing table according to the present invention for controlling the sharing of data among a plurality of computers.

FIGS. 4A and 4B illustrate another embodiment of a routing table according to the present invention for controlling the sharing of data among a plurality of computers.

DETAILED DESCRIPTION OF EMBODIMENTS OF THE INVENTION

Figure 1:
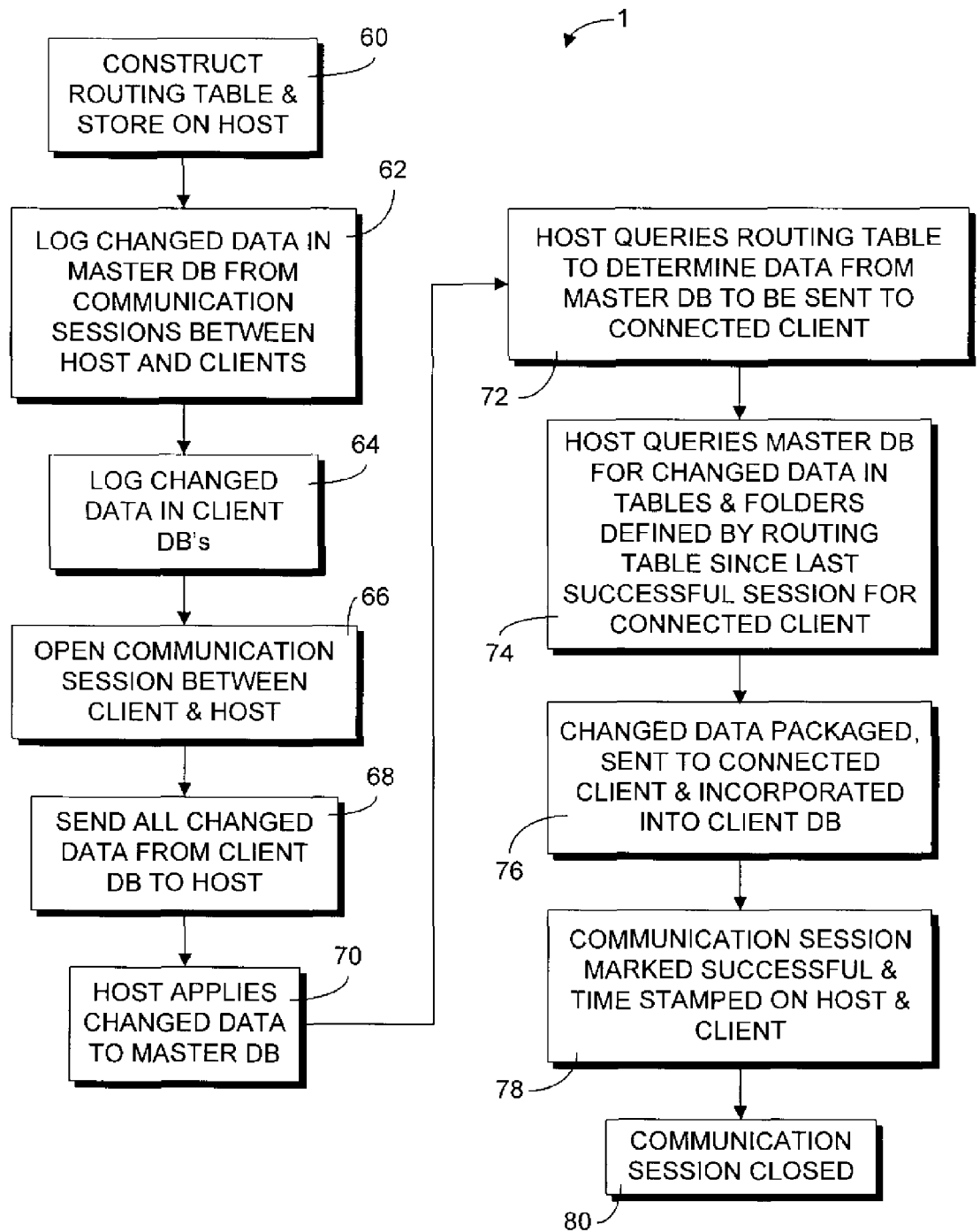
FIG. 1 is a flow diagram illustrating principal steps in an embodiment of a configurable distributed information sharing process according to the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring now to the drawing figures, the reference numeral 1 generally designates a configurable distributed data or information sharing system which is an embodiment of the present invention. The system 1 makes use of a data sharing table 2, such as the table shown in FIGS. 3A and 3B to control sharing of data among a group 4 of interconnected or intercommunicating computers 5, such as the group shown in FIG. 2. Data is shared among the computers 5 to facilitate operation of an entity, such as a retail business, a manufacturing operation, a governmental agency, or the like so that data generated by transactions and other activities at one of the computers 5 is made appropriately available to other computers 5 of the group 4. The retail business may, for example, be a chain of pharmacies, although the system 1 is in no way limited to use in a pharmacy environment.

Figure 2:
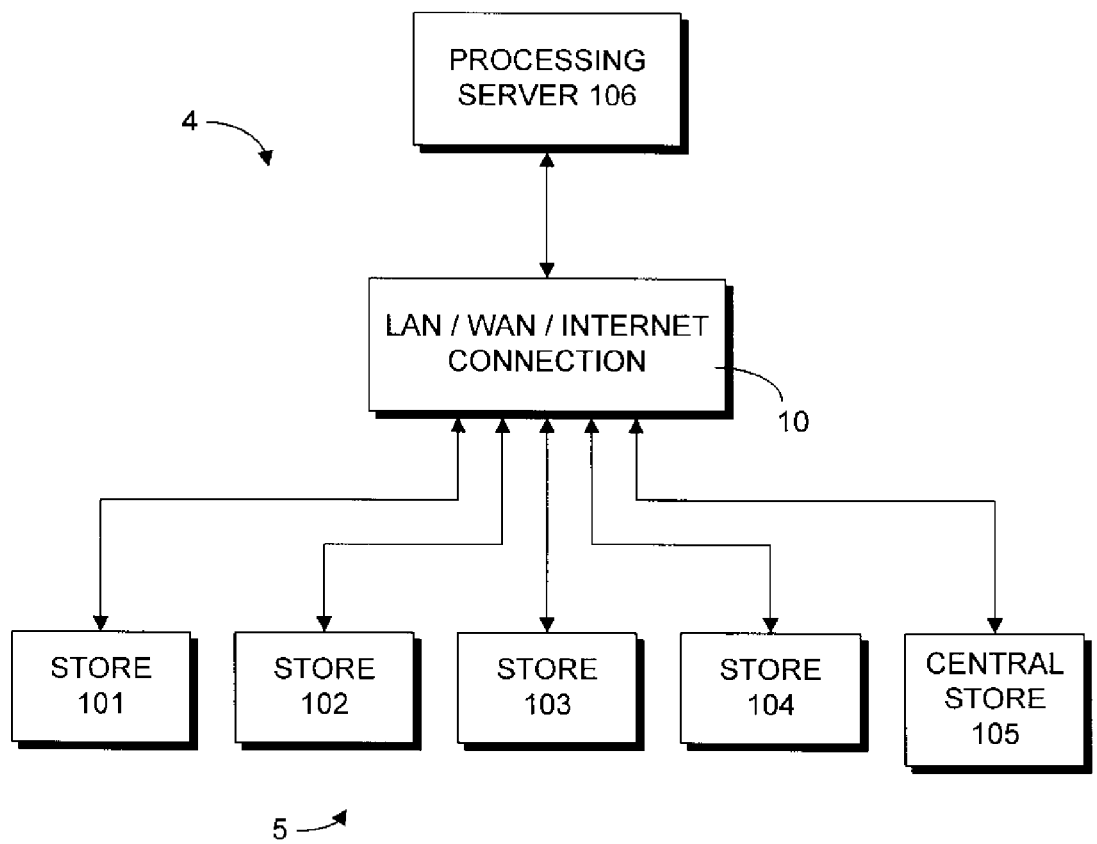
FIG. 2 is a block diagram illustrating a physical interconnection of a plurality of computers.

Referring to FIG. 2, the illustrated group 4 of computers 5 are shown in a typical physical connection configuration in which store computers 101-104 and a central store computer 105 are connected to a processing server 106 through a network system 10 which may be a local area network (LAN), a wide area network (WAN), or a universal computer network such as the Internet. The store computers 101, 102, 103, and 104 may be individual user computers in stores for facilitating commercial transactions or they may be servers within the stores to which other computers and computing devices are networked. The central store computer 105 may be a regional server which maintains a regional database of customer accounts, a regional inventory system, and the like. The processing server 106 may be a corporate headquarters server which maintains a master database of customer accounts, a master inventory system, an online catalog order system, and the like.

In a typical manner of operation, transactional data from the store computers 101-104 is conveyed through the network 10 to the processing server 106 and duplicated to the central store 105 from the processing server 106 through the network 10. Alternatively, the data from the store computers 101-104 may be transmitted to the central store 105 through the network 10 and duplicated from the central store 105 through the network 10 to the processing server 106. In addition to the data traffic from the store computers 101-104 to the processing server 106, there is data traffic in the opposite direction from the server 106 to the store computers 101-104 in the form of customer account database record updates, new product information, inventory information, sales campaign information, software updates, and other data. In particular, there is often a need for sharing of data among the store computers 101-104, particularly within a given region, state, or city.

FIGS. 3A and 3B illustrate an exemplary embodiment of a data sharing or routing table 2 which can be used in the system 1 to control the sharing of data among the computers 5 of the group 4, illustrated in FIG. 2. The illustrated data sharing table 2 includes a data source column 20 labeled "From Store ID" listing each data sending computer that will send data to other computers, a data destination column 22 labeled "To Store ID" matching each data receiving computer which will receive data with a particular data sending computer which will send data, a data identification column 24 labeled "Shared Information" listing the type or class of data that is to be shared by each data sending computer with a data receiving computer, and processing server identification column 26 listing which processing server each data sending computer will communicate data to and receive data from.

Comparing the entries in the source column 20 with the entries in the destination column 22, it can be seen that each of the store computers 101-104 is matched with each of the other store computers 101-104, thereby indicating that each store computer shares some kinds of data with every other store computer. Referring to the last four rows of FIG. 3B, it can be seen that each store computer 101-104 also shares data with the central store computer 105.

Referring to the data identification column 24, the table 2 lists the types of data that are shared between each data sending computer and data receiving computer. The illustrated types of data shared include types that might typically be appropriate to share within a pharmacy data system, and include patient account information, local SIG codes (pharmacy abbreviation codes), doctor information, and pricing information for various prescription drugs that will be dispensed. The illustrated data identification information in column 24 is intended to be exemplary and not exhaustive. The shared information may include whole data records, data fields for particular data records, tables, or the like. It should be noted that the data shared in the system 1 is, in most cases, "changed" data, that is, new data, modified data, or deleted data. The patient account information may include the customer's name, address, phone numbers, account number, insurance carrier, insurance plan, credit information, a history of prescriptions dispensed, and similar information. The SIG code and pricing information may be in the form of tables. The doctor information may include physician identity data, medical providers with whom the doctors practice, Drug Enforcement Administration (DEA) registration number, a history of prescriptions written, and similar information. The processing server ID column 26 lists the processing servers with which the various store computers 101-104 share information. While the illustrated column 26 lists only processing server 106, it is foreseen that multiple processing servers can be employed in a group 4 for processing and storing particular classes of data for the system 1.

FIGS. 4A and 4B illustrate an alternative expression of the data sharing table 2 and including a main routing table 30 and a data identification group table 32. The main routing table 30 includes a data source column 34 listing data sending computers, a data destination column 36 matching each data receiving computer with a data sending computer from which it will receive data, a data group identification (ID) column 38 which is substituted for the data identification column 24 of the table 2, and a processing server ID column 40. Columns 34, 36, and 40 in main routing table 30 function in a manner similar to corresponding columns 20, 22, and 26 in table 2.

The group ID column 38, in cooperation with the group table 32, functions in a manner similar to the data identification column 24 in table 2, but does so in a more compactly expressed manner. Because each of the store computers 101-104 communicates the same types of data to each other computer, including patient information, SIG codes, doctor information, and pricing information, those commonly shared types of data can be grouped and referred to in the main routing table 30 as data identity groups. As illustrated in FIG. 4B, the group table includes a group identification (ID) column 42 and a data identification or table column 44. The patient information, SIG codes, doctor information, and pricing information are designated as group 1 in a group ID column 42. Similarly, the all tables information is designated as group 2. Thus, the alternative data routing tables 30/32 function the same as the routing table 2 in a more compact format. Hereinafter, any references made to the data routing table 2 should be understood to apply also to the data sharing table set 30/32 since the tables are functionally equivalent.

The data sharing table 2 may be implemented as simple text base files which are stored on the processing server 106 or multiple processing servers if applicable. The tables 2 are read by the processing server(s) 106 at various times to direct the flow of data from data sending computers to data receiving computers, as will be detailed further in relation to the information sharing system 1 illustrated in FIG. 1.

Figure 5:
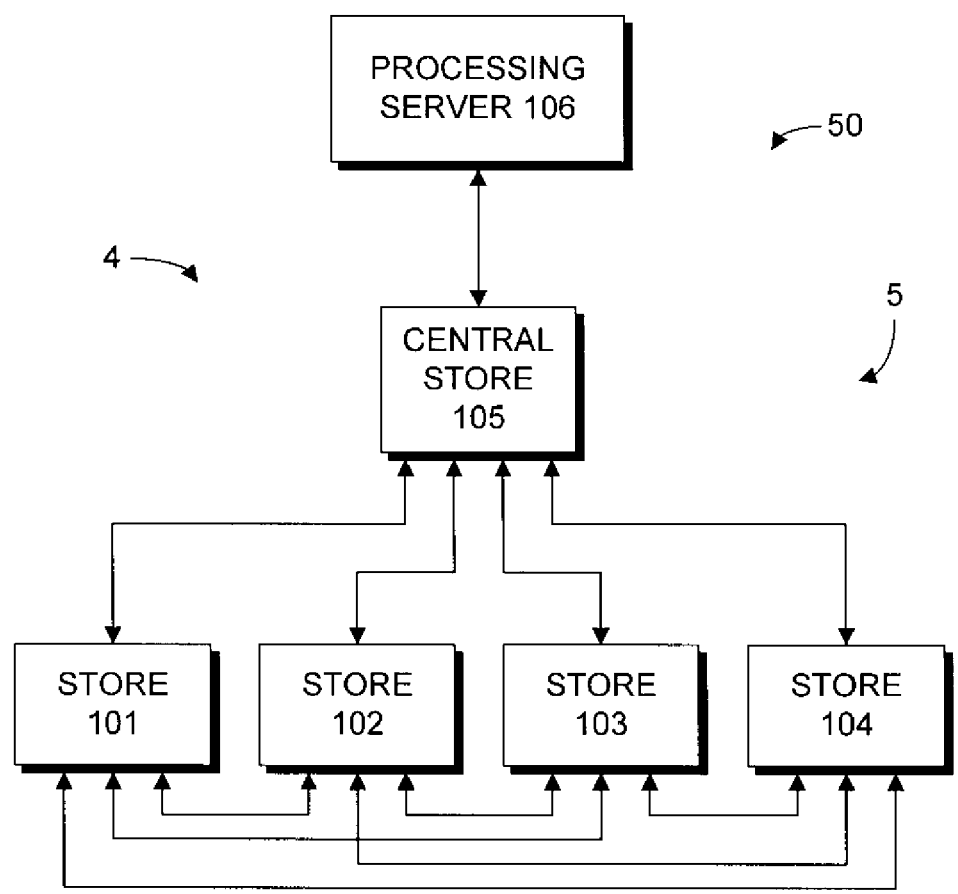
FIG. 5 is a block diagram illustrating a virtual interconnection of the plurality of computers illustrated in FIG. 2 by use of the routing tables illustrated in FIGS. 3 and 4.

While FIG. 2 shows a physical routing arrangement among the computers 5 of a group 4, FIG. 5 illustrates a virtual routing arrangement 50 of the computers 5 of the group 4, based on the entries and data routing relationships defined by the data routing table 2. As illustrated, the store computers 101-104 share data with one another and with the central store computer 105. Similarly, the central store computer 105 shares all data with the processing server 106 which also receives all data shared by the store computers 101-104. It should be noted that the data sharing arrangements can be selectively changed by changing the entries in the data routing table 2. In particular, computers 5 can be conveniently added to the group 4 and the data sharing arrangements added to the table 2 by adding appropriate entries to the data routing table 2. Similarly, computers 5 can be removed from the group 4, and table entries referring to the removed computers will be deleted from the table 2.

The process by which data sharing and routing is controlled in the system 1 is illustrated by the steps in FIG. 1. At step 60, the data sharing or routing table 2 is constructed and stored on a host computer, such as the processing server 106 in FIGS. 2 and 5. The table 2 may have an extended format as shown in FIGS. 3A and 3B or a compact format as shown by the table components 30/32 in FIGS. 4A and 4B. At step 62, changed data received from communication sessions between the host 106 and client computers, such as the computers 101-105 is logged in a master database stored on the host. At step 64, data changes at the client computers 101-105, usually as a result of commercial transactions, is logged locally of the respective client computers 101-105.

At step 66, a communication session is opened between a client computer 101-105 and a host computer 106, usually initiated by a client computer 101-105. Such communication sessions can occur at timed intervals, at random intervals, when a selected number of transactions have occurred at the client computer, at assigned times of day, or the like. When a communication session is opened at step 66, at step 68 the client computer 101-105 sends all changed data, logged at step 64, from the client database to the host 106. At step 70, the host 106 applies the changed client data to the master database, similar to the global activities referred to in step 62.

At step 72, the host 106 queries the routing table 2 to determine which types of changed data is to be sent to the currently connected client computer 101-105. At step 74, the host 106 queries the master database for the actual data in the tables and folders, as defined by the routing table 2, which has changed since the last successful communication session with the currently connected client computer.

At step 76, the changed data is packaged and formatted, as necessary, and sent to the currently connected client computer 101-105 by the host 106, where the received changed data is incorporated into the client computer's local database. At step 78, the communication session between the client computer 101-105 and the host computer 106 is designated successful, and a record of the successful session is time stamped and stored on the host 106 and the particular client computer 101-105. At step 80, the communication session between the client computer 101-105 is terminated. If a communication session should be interrupted prior to completion, any partially communicated data changes are discarded and the session steps, starting at step 66, are repeated at the next session, when the client computer 101-105 communicates with the host computer 106.

Figure 6:
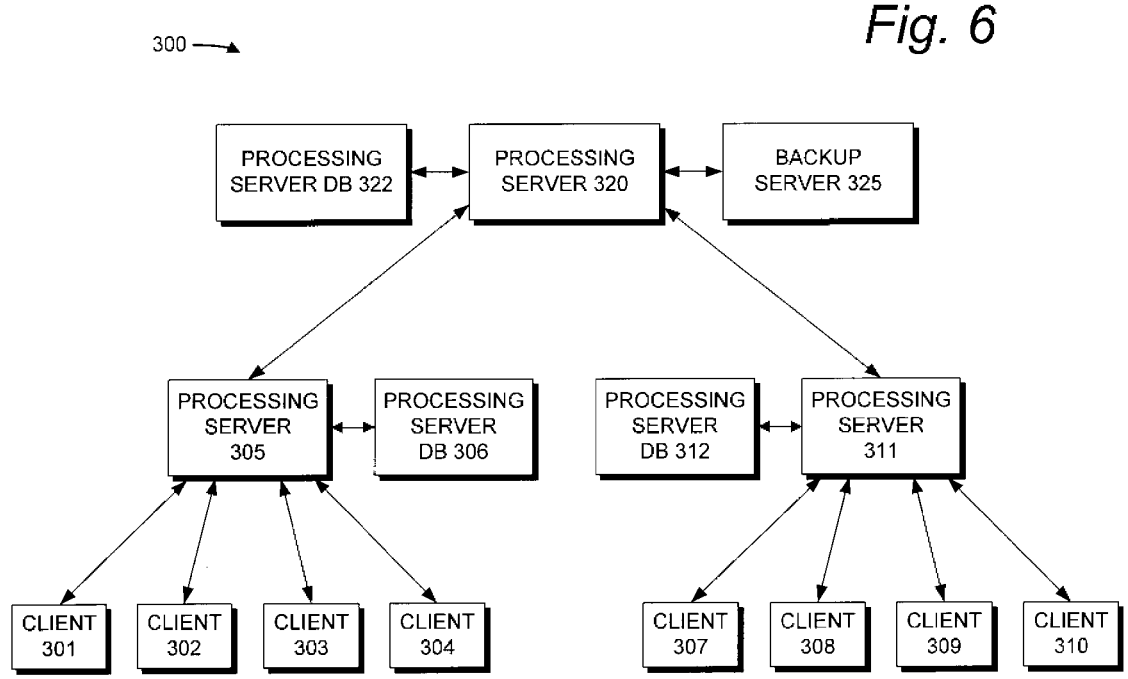
FIG. 6 is a block diagram illustrating physical interconnections of a plurality of client computers with multiple processing servers for which data sharing capabilities can be controlled by the processes of the present invention.

FIG. 6 illustrates a more complex physical intercommunication topology than the computers shown in FIG. 2. In FIG. 6, a computer system 300 includes client computers 301-304 which communicate with an intermediate processing server 305 which stores an intermediate processing server database 306. Similarly, client computers 307-310 communicate with an intermediate processing server 311 storing an intermediate processing server database 312. The processing servers 305 and 311 communicate with a higher level or master processing server 320 which stores a master processing server database 322 for the system 300. The master processing server 320 is illustrated to communicate with a backup server 325 which may store a mirror copy of the master database 322, as well as operating software for performing the functions of the processing server 320, if needed. The data sharing system 1 of the present invention is adaptable for defining and implementing data sharing relationships among the computers of the computer system 300.

Figure 7:
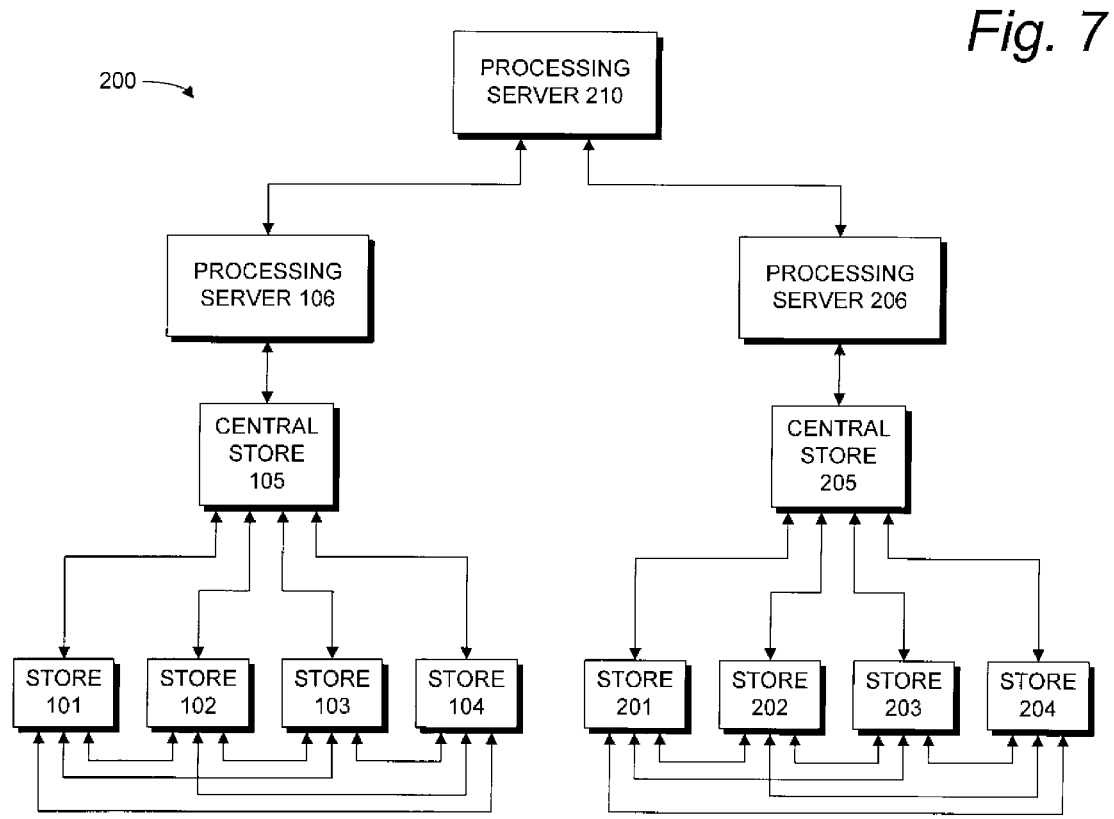
FIG. 7 is a block diagram illustrating virtual interconnections among an extended group of store client computers, central store computers, and multiple processing servers among which data sharing capabilities are controlled using the processes of the present invention.

FIG. 7 illustrates virtual routing among computers of a system 200 which is an extension of the virtual routing arrangement 50 shown in FIG. 5, as defined by a routing table, similar to but more complex than the routing table 2 and according to the data sharing system 1 shown in FIG. 1. Store computers 101-104 are illustrated as sharing data with each other and with a central store computer 105, which further shares data with a processing server 106. Similarly, store computers 201-204 share data with each other and with a central store 205, which further shares data with a processing server 206. The processing servers 106 and 206, in turn, share data with a master processing server 210 which stores a master database for the system 200.

The systems 300 in FIGS. 6 and 200 in FIG. 7 are simplified examples of computer systems which can be served by the data sharing system 1 and variations of the data routing table 2. Actual commercial systems of computers can extend to hundreds and thousands of computers in many hierarchies. The data sharing system 1 and data routing table 2 are adaptable to such extended commercial systems.

It is to be understood that while certain forms of the present invention have been illustrated and described herein, it is not to be limited to the specific forms or arrangement of parts described and shown.

What is claimed and desired to be secured by Letters Patent is:

1. A process for controlling the sharing of data entities among a plurality of intercommunicating computers, wherein at least one of said computers is a server computer, and wherein each computer which is not a server computer is a client computer, said process comprising the steps of:
   (a) storing a large set of said data entities of a plurality of data types at the server computer;
   (b) storing a small set of said data entities of selected data types at said client computers;
   (c) periodically communicating new, modified, or deleted data entities to said server computer from said client computers;
   (d) storing on said server computer a data sharing table including:
      (1) a source column listing each client data sending computer which is to communicate data entities with any other of said computers;
      (2) a destination column listing each client data receiving computer matched with each client data sending computer from which data entities are to be communicated to a given client data receiving computer; and
      (3) a data identification column matching each data type with each client data sending computer which will communicate data entities of a given data type and each client data receiving computer which will receive data entities of said given data type from selected client data sending computers; and
   (e) upon any client data sending computer communicating a new, modified, or deleted data entity to said server computer, said server computer communicating said new, modified, or deleted data entity to any client data receiving computer designated by said data sharing table to receive a data entity of the data type of said new, modified, or deleted data entity from said client data sending computer.

2. A process as set forth in claim 1 and including the step of:
   (a) upon any client data sending computer communicating a new, modified, or deleted data entity to said server computer, said server computer storing said new, modified, or deleted data entity on said server computer.

3. A process as set forth in claim 1 and including the steps of:
   (a) expanding said plurality of intercommunicating computers by adding at least one new client computer communicating with said server computer;
   (b) adding a source entry to said source column identifying said new client computer;
   (c) adding a respective destination entry in said destination column listing any client data receiving computer to which said new client computer is to communicate data entities; and
   (d) adding a respective data type entry in said data identification column listing any data type of data entity which said new client computer is to communicate to any of said client data receiving computers.

4. A process as set forth in claim 1 and including the steps of:
   (a) reducing said plurality of intercommunicating computers by removing at least one excess client computer from communication with said server computer;
   (b) deleting any source entry in said source column identifying said excess client computer;
   (c) deleting any destination entry in said destination column related to said excess client; and
   (d) deleting any data type entry in said data identification column related to said excess client computer.

5. A process as set forth in claim 1 wherein said server computer is a first server computer and including the steps of:
   (a) providing one of said intercommunicating computers as a second server computer;
   (b) storing said data sharing table on said second server computer; and
   (c) providing entries in said data sharing table to cause selected data entities communicated to said second server computer to be communicated to selected other computers of said intercommunicating computers.

6. A process as set forth in claim 5 and including the step of:
   (a) communicating at least some of said data entities between said first server computer and said second server computer.

7. A process as set forth in claim 5 wherein said first server computer operates as a client computer relative to said second server computer and including the step of:
   (a) providing entries in said data sharing table to cause said first server computer to communicate selected new, modified, or deleted data entities received from selected ones of said client data sending computers to said second server computer for further communication to selected ones of said client data receiving computers.

8. A process as set forth in claim 5 and including the steps of:
   (a) providing at least one data non-receiving computer communicating with one of said server computers; and
   (b) said data non-receiving computer periodically communicating new, modified, or deleted data entities to said one of said server computers.

9. A process as set forth in claim 1 including the steps of:
   (a) each of said client computers logging each respective new, modified, or deleted data entity occurring thereon;
   (b) upon each of said client computers next communicating with said server computer, each client computer communicating only new, modified, or deleted data entities to said server computer; and
   (c) said server computer communicating only said new, modified, or deleted data entities to said client data receiving computers according to said data sharing table when a respective client data receiving computer next communicates with said server computer.

10. A process for controlling the sharing of data entities among a plurality of intercommunicating computers, wherein at least one of said computers is a server computer, and wherein each computer which is not a server computer is a client computer, said process comprising the steps of:
    (a) storing a large set of said data entities of a plurality of data types at the server computer;
    (b) storing a small set of said data entities of selected data types at said client computers;
    (c) periodically communicating new, modified, or deleted data entities to said server computer from said client computers;
    (d) storing on said server computer a data sharing table including:
       (1) a source column listing each client data sending computer which is to communicate data entities with any other of said computers;
       (2) a destination column listing each client data receiving computer matched with each client data sending computer from which data entities are to be communicated to a given client data receiving computer; and
       (3) a data identification column matching each data type with each client data sending computer which will communicate data entities of a given data type and each client data receiving computer which will receive data entities of said given data type from selected client data sending computers;

(e) each of said client computers logging each respective new, modified, or deleted data entity occurring thereon;

(f) upon each of said client computers next communicating with said server computer, each client computer communicating only new, modified, or deleted data entities to said server computer; and (g) said server computer communicating only said new, modified, or deleted data entities to said client data receiving computers according to said data sharing table when a respective client data receiving computer next communicates with said server computer.

11. A process as set forth in claim 10 and including the step of:

(a) upon any client data sending computer communicating a new, modified, or deleted data entity to said server computer, said server computer storing said new, modified, or deleted data entity on said server computer.

12. A process as set forth in claim 10 and including the steps of:

(a) expanding said plurality of intercommunicating computers by adding at least one new client computer communicating with said server computer;

(b) adding a source entry to said source column identifying said new client computer;

(c) adding a respective destination entry in said destination column listing any client data receiving computer to which said new client computer is to communicate data entities; and (d) adding a respective data type entry in said data identification column listing any data type of data entity which said new client computer is to communicate to any of said client data receiving computers.

13. A process as set forth in claim 10 and including the steps of:

(a) reducing said plurality of intercommunicating computers by removing at least one excess client computer from communication with said server computer;

(b) deleting any source entry in said source column identifying said excess client computer;

(c) deleting any destination entry in said destination column related to said excess client; and (d) deleting any data type entry in said data identification column related to said excess client computer.

14. A process as set forth in claim 10 wherein said server computer is a first server computer and including the steps of:

(a) providing one of said intercommunicating computers as a second server computer;

(b) storing said data sharing table on said second server computer; and (c) providing entries in said data sharing table to cause selected data entities communicated to said second server computer to be communicated to selected other computers of said intercommunicating computers.

15. A process as set forth in claim 14 and including the step of:

(a) communicating at least some of said data entities between said first server computer and said second server computer.

16. A process as set forth in claim 14 wherein said first server computer operates as a client computer relative to said second server computer and including the step of:

(a) providing entries in said data sharing table to cause said first server computer to communicate selected new, modified, or deleted data entities received from selected ones of said client data sending computers to said second server computer for further communication to selected ones of said client data receiving computers.

17. A process as set forth in claim 14 and including the steps of:

(a) providing at least one data non-receiving computer communicating with one of said server computers; and (b) said data non-receiving computer periodically communicating new, modified, or deleted data entities to said one of said server computers.

18. A process for controlling the sharing of data entities among a plurality of intercommunicating computers, wherein at least one of said computers is a server computer, and wherein each computer which is not a server computer is a client computer, said process comprising the steps of:

(a) storing a large set of said data entities of a plurality of data types at the server computer;

(b) storing a small set of said data entities of selected data types at said client computers;

(c) periodically communicating new, modified, or deleted data entities to said server computer from said client computers;

(d) storing on said server computer a data sharing table including:

(1) a source column listing each client data sending computer which is to communicate data entities with any other of said computers;

(2) a destination column listing each client data receiving computer matched with each client data sending computer from which data entities are to be communicated to a given client data receiving computer; and (3) a data identification column matching each data type with each client data sending computer which will communicate data entities of a given data type and each client data receiving computer which will receive data entities of said given data type from selected client data sending computers;

(e) each of said client computers logging each respective new, modified, or deleted data entity occurring thereon;

(f) upon each of said client computers next communicating with said server computer, each client computer communicating only new, modified, or deleted data entities to said server computer;

(g) said server computer communicating only said new, modified, or deleted data entities to said client data receiving computers according to said data sharing table when a respective client data receiving computer next communicates with said server computer;

(h) providing one of said intercommunicating computers as a second server computer;

(i) storing said data sharing table on said second server computer; and (j) providing entries in said data sharing table to cause selected data entities communicated to said second server computer to be communicated to selected other computers of said intercommunicating computers.

19. A process as set forth in claim 18 and including the step of:

(a) communicating at least some of said data entities between said first server computer and said second server computer.

20. A process as set forth in claim 18 wherein said first server computer operates as a client computer relative to said second server computer and including the step of:

(a) providing entries in said data sharing table to cause said first server computer to communicate selected new, modified, or deleted data entities received from selected ones of said client data sending computers to said second server computer for further communication to selected ones of said client data receiving computers.

21. A process as set forth in claim 18 and including the steps of:
   (a) providing at least one data non-receiving computer communicating with one of said server computers; and
   (b) said data non-receiving computer periodically communicating new, modified, or deleted data entities to said one of said server computers.

22. A process as set forth in claim 18 and including the step of:
   (a) upon any client data sending computer communicating a new, modified, or deleted data entity to one of said first and second server computers, storing said new, modified, or deleted data entity on at least one of said server computers.

23. A process as set forth in claim 18 and including the steps of:
   (a) expanding said plurality of intercommunicating computers by adding at least one new client computer communicating with one of said server computers;
   (b) adding a source entry to said source column identifying said new client computer;
   (c) adding a respective destination entry in said destination column listing any client data receiving computer to which said new client computer is to communicate data entities; and
   (d) adding a respective data type entry in said data identification column listing any data type of data entity which said new client computer is to communicate to any of said client data receiving computers.

24. A process as set forth in claim 18 and including the steps of:
   (a) reducing said plurality of intercommunicating computers by removing at least one excess client computer from communication with said server computers;
   (b) deleting any source entry in said source column identifying said excess client computer;
   (c) deleting any destination entry in said destination column related to said excess client; and
   (d) deleting any data type entry in said data identification column related to said excess client computer.

* * * * *